US010151528B2

(12) United States Patent
Van Aken et al.

(10) Patent No.: US 10,151,528 B2
(45) Date of Patent: Dec. 11, 2018

(54) METHOD OF LIQUEFYING A CONTAMINATED HYDROCARBON-CONTAINING GAS STREAM

(71) Applicant: SHELL OIL COMPANY, Houston, TX (US)

(72) Inventors: Michiel Gijsbert Van Aken, The Hague (NL); Mariska Wolters-Den Breejen, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 378 days.

(21) Appl. No.: 14/783,306

(22) PCT Filed: Apr. 8, 2014

(86) PCT No.: PCT/EP2014/057007
§ 371 (c)(1),
(2) Date: Oct. 8, 2015

(87) PCT Pub. No.: WO2014/166925
PCT Pub. Date: Oct. 16, 2014

(65) Prior Publication Data
US 2016/0069609 A1   Mar. 10, 2016

(30) Foreign Application Priority Data
Apr. 11, 2013   (EP) .................................... 13163349

(51) Int. Cl.
*F25J 1/00*   (2006.01)
*F25J 3/08*   (2006.01)
(Continued)

(52) U.S. Cl.
CPC ............. *F25J 1/0022* (2013.01); *F25J 1/004* (2013.01); *F25J 1/0035* (2013.01); *F25J 1/0037* (2013.01);
(Continued)

(58) Field of Classification Search
CPC ........ F25J 1/0022; F25J 1/0201–1/0202; F25J 2205/20; F25J 2270/08; F25J 3/061
See application file for complete search history.

(56) References Cited

U.S. PATENT DOCUMENTS 3,376,709 A    4/1968  Dickey et al.
6,564,578 B1 *  5/2003  Fischer-Calderon ....................... F25J 1/0022
                                                                                 62/613
(Continued)

FOREIGN PATENT DOCUMENTS

CN    201028930 Y    2/2008
CN    101421574 A    4/2009
(Continued)

OTHER PUBLICATIONS

PCT International Search Report, Application No. PCT/EP2014/057007 dated Dec. 15, 2014.
(Continued)

*Primary Examiner* — Tareq Alosh

(57) ABSTRACT

A method of liquefying a contaminated hydrocarbon-containing gas stream includes cooling the stream in a first heat exchanger and cooling the cooled stream in an expander to obtain a partially liquefied stream. The method further includes separating the partially liquefied stream in a separator to obtain a gaseous stream and a liquid stream. The liquid stream is expanded to obtain a multiphase stream containing at least a vapour phase, a liquid phase and a solid phase. The multiphase stream is separated in a separator to obtain a gaseous stream and a slurry stream. The slurry
(Continued)

stream is separated in a solid/liquid separator to obtain a liquid hydrocarbon stream and a concentrated slurry stream. The gaseous stream is passed through the first heat exchanger to obtain a heated gaseous stream. The heated gaseous stream is compressed and combined with the contaminated hydrocarbon-containing gas stream.

7 Claims, 1 Drawing Sheet

(51) Int. Cl.
  *F25J 3/06* (2006.01)
  *F25J 1/02* (2006.01)
(52) U.S. Cl.
  CPC .......... *F25J 1/0042* (2013.01); *F25J 1/0202* (2013.01); *F25J 1/0267* (2013.01); *F25J 3/061* (2013.01); *F25J 3/065* (2013.01); *F25J 3/067* (2013.01); *F25J 3/0635* (2013.01); *F25J 3/08* (2013.01); *F25J 2205/02* (2013.01); *F25J 2205/10* (2013.01); *F25J 2205/20* (2013.01); *F25J 2220/64* (2013.01); *F25J 2220/66* (2013.01); *F25J 2230/30* (2013.01); *F25J 2235/60* (2013.01); *F25J 2245/90* (2013.01); *Y02C 10/12* (2013.01)

(56) References Cited

U.S. PATENT DOCUMENTS

| | | |
|---|---|---|
| 2002/0174678 A1 | 11/2002 | Wilding et al. |
| 2003/0089125 A1 | 5/2003 | Fredheim et al. |
| 2006/0213222 A1 | 9/2006 | Whitesell |
| 2009/0241593 A1 | 10/2009 | Jager et al. |
| 2011/0094263 A1 | 4/2011 | Wilding et al. |
| 2013/0340475 A1* | 12/2013 | Turner ................ F25J 1/0022 62/613 |
| 2015/0159946 A1 | 6/2015 | Valencia |

FOREIGN PATENT DOCUMENTS

| WO | 03062725 A1 | 7/2003 |
|---|---|---|
| WO | 2010023238 A1 | 3/2010 |
| WO | 2010079175 A2 | 7/2010 |
| WO | 2012068588 A1 | 5/2012 |
| WO | 2012162690 A2 | 11/2012 |
| WO | 2014058648 A1 | 4/2014 |
| WO | 2014166925 A2 | 10/2014 |
| WO | 2015017357 A1 | 2/2015 |

OTHER PUBLICATIONS

International Search Report and Written Opinion received for PCT Patent Application No. PCT/EP2016/079403, dated Mar. 3, 2017, 10 pages.
International Search Report and Written Opinion received for PCT Patent Application No. PCT/EP2016/079386, dated Mar. 1, 2017, 8 pages.
International Search Report and Written Opinion received for PCT Patent Application No. PCT/EP2016/079392, dated Mar. 16, 2017, 9 pages.
Price, "Small-Scale LNG Facility Development", Hydrocarbon Processing, Jan. 1, 2003, vol. 82, Issue No. 1, pp. 37-39.

* cited by examiner

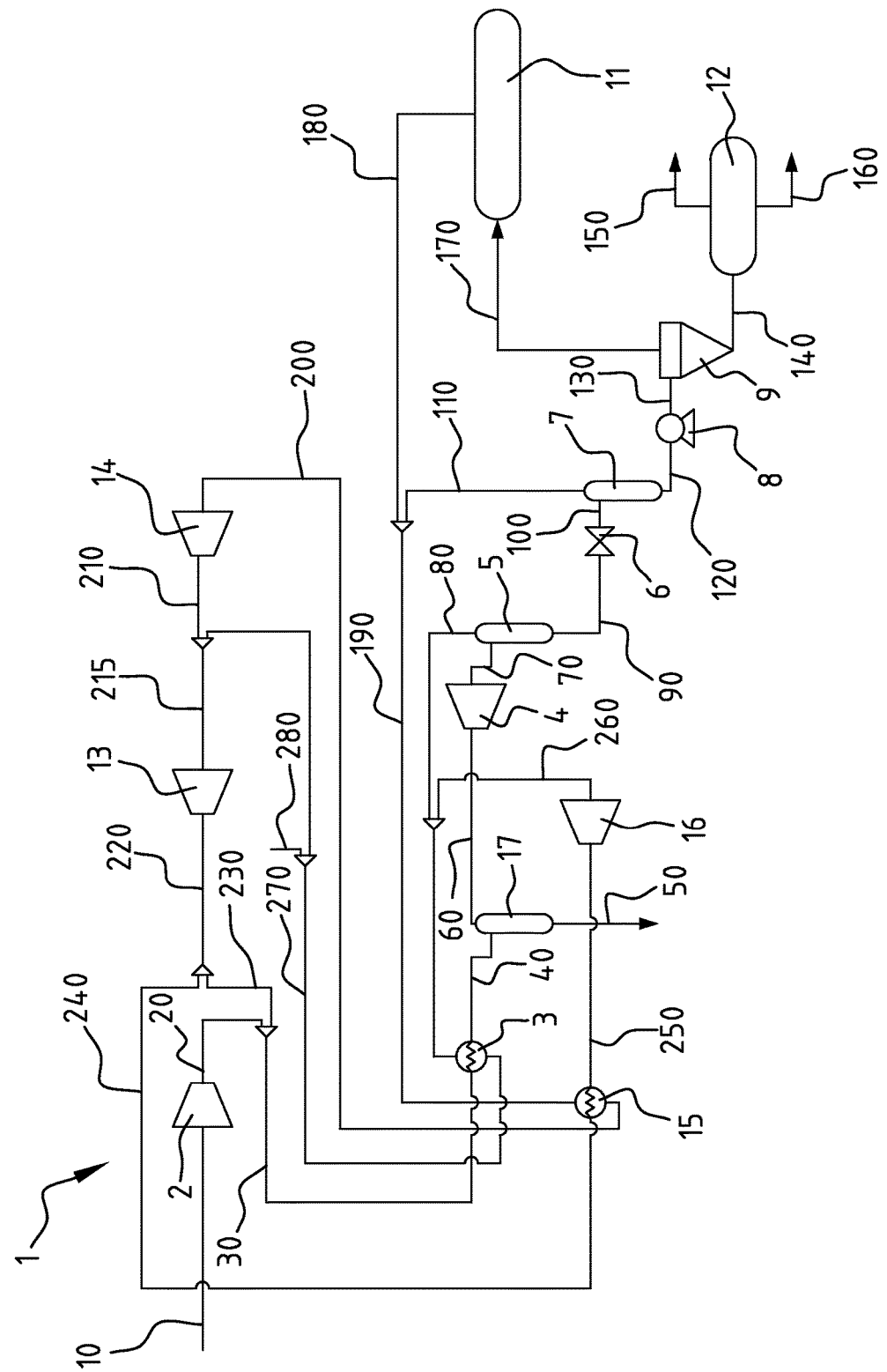

METHOD OF LIQUEFYING A CONTAMINATED HYDROCARBON-CONTAINING GAS STREAM

CROSS-REFERENCE TO RELATED APPLICATIONS

The present application is a National Stage (§ 371) application of PCT/EP2014/057007, filed Apr. 8, 2014, which claims the benefit of European Application No. 13163349.7, filed Apr. 11, 2013, which is incorporated herein by reference in its entirety.

The present invention relates to a method of liquefying a contaminated hydrocarbon-containing gas stream, in particular a methane-containing contaminated gas stream such as natural gas.

Methods of liquefying hydrocarbon-containing gas streams are well known in the art. It is desirable to liquefy a hydrocarbon-containing gas stream such as natural gas stream for a number of reasons. As an example, natural gas can be stored and transported over long distances more readily as a liquid than in gaseous form, because it occupies a smaller volume and does not need to be stored at high pressures. Typically, before being liquefied, the contaminated hydrocarbon-containing gas stream is treated to remove one or more contaminants (such as $H_2O$, $CO_2$, $H_2S$ and the like) which may freeze out during the liquefaction process.

A problem of known methods of liquefying a contaminated hydrocarbon-containing gas stream is that it is a rather complex process, requiring a lot of expensive equipment.

It is an object of the present invention to solve or at least minimize the above problem.

It is a further object of the present invention to provide a simpler and more cost-effective method of liquefying a contaminated hydrocarbon-containing gas stream, in particular a methane-containing contaminated gas stream such as natural gas.

It is another object to provide a method of liquefying a contaminated hydrocarbon-containing gas stream for small scale operations, i.e. having a production rate of at most 0.1 mtpa (million tons per annum).

One or more of the above or other objects are achieved according to the present invention by providing a method of liquefying a contaminated hydrocarbon-containing gas stream, the method comprising at least the steps of:
(a) providing a contaminated hydrocarbon-containing gas stream;
(b) cooling the contaminated hydrocarbon-containing gas stream in a first heat exchanger thereby obtaining a cooled contaminated hydrocarbon-containing stream;
(c) cooling the cooled contaminated hydrocarbon-containing stream in an expander thereby obtaining a partially liquefied stream;
(d) separating the partially liquefied stream in a separator thereby obtaining a gaseous stream and a liquid stream;
(e) expanding the liquid steam obtained in step (d) thereby obtaining a multiphase stream, the multiphase stream containing at least a vapour phase, a liquid phase and a solid phase;
(f) separating the multiphase stream in a separator thereby obtaining a gaseous stream and a slurry stream;
(g) separating the slurry stream in a solid/liquid separator thereby obtaining a liquid hydrocarbon stream and a concentrated slurry stream;
(h) passing the gaseous stream obtained in step (d) through the first heat exchanger thereby obtaining a heated gaseous stream; and
(i) compressing the heated gaseous stream thereby obtaining a compressed gas stream; and
(j) combining the compressed gas stream obtained in step (i) with the contaminated hydrocarbon-containing gas stream provided in step (a).

An advantage of the method according to the present invention is that it has a surprisingly simple design and can be standardized to treat and liquefy a wide range of feed gas compositions. Further, there is relatively limited utility and chemicals requirement resulting in a significant OPEX and CAPEX reduction. Furthermore, the design is more robust with respect to trace contaminants such as rust and oil particles, compared to designs with amine treating systems.

As the method according to the present invention does not require connection to the grid (as the gaseous stream obtained in step (d) is combined with the contaminated hydrocarbon-containing stream provided in step (a)), the application of the method is very flexible. The method of the present invention is in particular suitable for small scale operations (production rate of at most 0.1 mtpa).

An important aspect of the present invention is that the liquid hydrocarbon product stream obtained in step (e) may have a different composition, e.g. containing more $CO_2$ (such as at least 250 ppm-mol) and more $C_{5+}$ (such as above 0.1 mol %) than usual.

In step (a), a contaminated hydrocarbon-containing gas stream is provided. Although the contaminated hydrocarbon-containing gas stream is not particularly limited, it preferably is a methane-rich gas stream such as natural gas. According to a preferred embodiment, the contaminated hydrocarbon-containing gas stream comprises at least 50 mol % methane, preferably at least 80 mol %. Preferably, the hydrocarbon fraction of the contaminated hydrocarbon-containing gas stream comprises especially at least 75 mol % of methane, preferably at least 90 mol %. The hydrocarbon fraction in the natural gas stream may suitably contain from between 0 and 25 mol % of $C_{2+}$-hydrocarbons (i.e. hydrocarbons containing 2 or more carbon atoms per molecule), preferably between 0 and 20 mol % of $C_2$-$C_6$ hydrocarbons, more preferably between 0.3 and 18 mol % of $C_2$-$C_4$ hydrocarbons, especially between 0.5 and 15 mol % of ethane.

The contaminant is also not particularly limited. Typically, the contaminant is one or more of $CO_2$, $H_2S$, $H_2O$, $C_{6+}$ hydrocarbons, aromatic compounds, but is in particular $CO_2$.

The amount of contaminant in the contaminated hydrocarbon-containing gas stream is suitably between 0.5 and 90 mol %, preferably above 1.0 mol % and preferably below 10 mol %.

Before cooling in step (b), the contaminated hydrocarbon-containing gas stream may have been treated. As an example, if the contaminated hydrocarbon-containing gas stream contains water (e.g. more than 1 ppmv), then the contaminated hydrocarbon-containing gas stream may be dehydrated to prevent hydrate formation in the subsequent cooling steps. As the person skilled in the art is familiar with dehydration of gas streams (e.g. using adsorption by desiccants) this is not further discussed here. Preferably, methanol is injected into the contaminated hydrocarbon-containing gas stream to prevent the formation of hydrates.

In step (b), the contaminated hydrocarbon-containing gas stream is cooled in a first heat exchanger thereby obtaining a cooled contaminated hydrocarbon-containing stream. The heat exchanger is not particularly limited, but is preferably an indirect heat exchanger. Preferably, in step (b) no solids are formed; hence, the cooled contaminated hydrocarbon-containing gas stream is preferably free of solids. Typically, the cooled contaminated hydrocarbon-containing gas stream is a gas stream possibly containing some liquid methanol, if previously injected.

Preferably, the cooled contaminated hydrocarbon-containing stream obtained in step (b) has a temperature of at most −40° C., preferably at most −50° C., more preferably at most −60° C.

In step (c), the cooled contaminated hydrocarbon-containing gas stream is cooled in an expander thereby obtaining a partially liquefied stream. If desired, and if methanol has been injected upstream to avoid hydrate formation, the cooled contaminated hydrocarbon-containing gas stream may be subjected to a methanol separation step before being cooled in the expander.

In step (d), the partially liquefied stream is separated in a separator thereby obtaining a gaseous stream and a liquid stream In step (e), the liquid steam obtained in step (d) is expanded thereby obtaining a multiphase stream, the multiphase stream containing at least a vapour phase, a liquid phase and a solid phase. Typically, the multiphase stream contains at least 20 mol % vapour.

Although the expander as used in step (e) according to the present invention is not particularly limited (and may include a JT valve an orifice, a common expander, etc.), it is preferred that in the expander enthalpy is withdrawn from the cooled contaminated hydrocarbon-containing gas stream. A suitable expander for withdrawing enthalpy whilst expanding is a turbo-expander. Preferably, the cooled contaminated hydrocarbon-containing gas stream as fed into the expander has a pressure of from 40 to 200 bara, more preferably from 60 to 100 bara. The multiphase stream as removed from the expander typically has a pressure of from 1 to 10 bara, preferably below 7 bara, more preferably below 3 bara.

Preferably, the multiphase stream obtained in step (e) has a temperature of at most −100° C. (i.e. not warmer than −100° C.), preferably at most −120° C., more preferably at most −140° C., most preferably at most −150° C.

In step (f), the multiphase stream is separated in a separator thereby obtaining a gaseous stream and a slurry stream. It is preferred that the slurry stream obtained in step (f) is pressurized before being separated in step (g), to minimize vapour generation in the solid/liquid separator in step (g). Also, pressurizing the slurry stream obtained in step (f) prevents solids formation in a storage tank (if any) in which the liquid hydrocarbon stream obtained in step (g) is stored. Preferably the slurry stream is pumped to at least 6 bara.

In step (g), the slurry stream is separated in a solid/liquid separator thereby obtaining a liquid hydrocarbon stream and a concentrated slurry stream. Typically, the concentrated slurry stream is rich in contaminants. The concentrated slurry stream may comprise more than one contaminant. The concentrated slurry stream usually contains at least 20 mol % contaminant(s) and at most 80 mol % methane. If (one of) the contaminant(s) in the concentrated slurry stream is $CO_2$, then the concentrated slurry stream preferably comprises at least 25 mol % $CO_2$. Preferably, the concentrated slurry stream is heated to melt and/or evaporate the contaminant(s). Preferably, the concentrated slurry stream is melted (preferably in a heated vessel) to obtain a liquid contaminant stream (typically containing at least 80 mol % $C_{5+}$) and a gaseous contaminant stream (typically containing at least 80 mol % $CO_2/N_2$, if the contaminant comprises $CO_2$). As the gaseous contaminant stream may still comprise some hydrocarbons, it may be recycled to be used as (part of) a fuel stream.

In step (h), the gaseous stream obtained in step (d) is passed through the first heat exchanger thereby obtaining a heated gaseous stream. The heated gaseous stream typically comprises at least 80 mol % methane and at most 20 mol % $N_2$.

In step (i), the heated gaseous stream obtained in step (h) is compressed thereby obtaining a compressed gas stream. In step (j), the compressed gas stream obtained in step (i) is combined with the contaminated hydrocarbon-containing gas stream provided in step (a).

Typically, the heated gaseous stream obtained in step (i) is compressed to a pressure equal to the pressure of the contaminated hydrocarbon-containing gas stream provided in step (a), before being combined therewith. An advantage of combining the (lean) heated gaseous stream with the contaminated hydrocarbon-containing gas stream is that the contaminant level in the feed is lowered, allowing deeper pre-cooling. A further advantage of combining the compressed gas stream obtained in step (i) is that no grid is needed to discharge this stream; as a result the method can be performed at remote locations.

Also, the contaminated hydrocarbon-containing gas stream provided in step (a) has typically been compressed before being cooled in step (b) and combined in step (j).

According to a preferred embodiment of the method according to the present invention, the method further comprises: cooling a part (preferably at least 60 vol. %) of the compressed gas stream obtained in step (i) through a second heat exchanger thereby obtaining a cooled compressed gas stream; expanding the cooled compressed gas stream thereby obtaining an expanded an expanded gas stream; and combining the expanded gas stream with the gaseous stream obtained in step (d).

Further, it is preferred that the method further comprises: passing the gaseous stream obtained in step (f) through the second heat exchanger thereby obtaining a second heated gaseous stream; compressing the second heated gaseous stream thereby obtaining a second compressed gas stream; and combining the second compressed gas stream with the heated gaseous stream obtained in step (h).

Typically, the liquid hydrocarbon stream obtained in step (g) is stored in a storage tank, and wherein a boil-off gas stream from said storage tank is combined with the gaseous stream obtained in step (f). Alternatively, the boil-off gas stream may be heated and compressed separately and sent to a fuel system.

In a further aspect the present invention provides a liquid hydrocarbon stream obtained in step (g) of the method according to the present invention, comprising at least 80 mol % methane and at least 250 ppm-mol $CO_2$. It is preferred that all the $CO_2$ is dissolved; hence the liquid hydrocarbon stream does preferably not contain solid $CO_2$. Further, the liquid hydrocarbon stream preferably comprises dissolved $CO_2$ up to saturation level at storage conditions; at a temperature of at most −100° C. (preferably at most −150° C.) the liquid hydrocarbon stream preferably comprises from 800 ppm-mol to 3.5 mol % $CO_2$.

Furthermore it is preferred that the liquid hydrocarbon stream further comprises above 0.1 mol % $C_{5+}$, preferably at least 0.2 mol %, more preferably at least 0.5 mol %, even more preferably at least 0.8 mol % or even at least 1.0 mol %. In the context of the present invention, $C_{5+}$ refers to hydrocarbons containing 5 or more carbon atoms per molecule, such as pentane, hexane and the like. Also, the liquid hydrocarbon stream preferably comprises at least 0.002 mol %, preferably at least 0.005 mol % benzene.

Hereinafter the invention will be further illustrated by the following non-limiting drawing. Herein shows:

FIG. 1 schematically a process scheme for performing the method according to the present invention.

For the purpose of this description, same reference numbers refer to same or similar components.

FIG. 1 schematically shows a process scheme for performing a method of liquefying a contaminated hydrocarbon-containing gas stream. The process scheme is generally referred to with reference number 1.

The process scheme 1 comprises a compressor 2, a heat exchanger 3 ("the first heat exchanger"), an expander 4, a first separator 5, a JT-valve 6, a second separator 7, a pump 8, a third (solid/liquid0 separator 9, an LNG storage tank 11, a slurry heater 12, further compressors 13 and 14, a second heat exchanger 15, an expander 16 and a methanol separator 17. The process scheme may comprise further heat exchangers in addition to the first heat exchanger 3 and second heat exchanger 15. Preferably, the first heat exchanger 3 and second heat exchanger 15 are separate heat exchangers.

During use of the process scheme 1 according to the present invention, a contaminated hydrocarbon-containing gas stream 20 is provided (which has previously been compressed as stream 10 in compressor 2). This contaminated hydrocarbon-containing gas stream 20 is typically a natural gas stream. The contaminated hydrocarbon-containing gas stream 20 is cooled (as stream 30) in the first heat exchanger 3 thereby obtaining a cooled contaminated hydrocarbon-containing gas stream 40. The first heat exchanger 3 is (like the second heat exchanger 15) an indirect heat exchanger; hence no direct contact between the streams takes place, but only heat exchanging contact.

As shown in the embodiment of FIG. 1, the cooled contaminated hydrocarbon-containing stream 40 is passed to the methanol separator 17 to separate methanol (as stream 50) that has been previously injected (e.g. into stream 20) to prevent hydrate formation. After the methanol separator 17, the (methanol-depleted) cooled contaminated hydrocarbon-containing gas stream is further cooled as stream 60 in the expander 4 thereby obtaining a partially liquefied stream 70. This partially liquefied stream 70 is separated in separator 5 thereby obtaining a gaseous stream 80 and a liquid stream 90. The liquid steam 90 is expanded in JT-valve 6 thereby obtaining a multiphase stream 100. The multiphase stream 100 is separated in the separator 7 thereby obtaining a gaseous stream 110 and a slurry stream 120.

The slurry stream 120 is separated in the solid/liquid separator 9 thereby obtaining a liquid hydrocarbon stream 170 and a concentrated slurry stream 140. The solid/liquid separator 9 is not particularly limited and can for example be selected from a cyclone, settler, filter or a combination thereof.

The liquid hydrocarbon stream 170 is the product stream and is typically an LNG stream. The liquid stream 170 as obtained according to the present invention may have a composition that is different from known compositions, in terms of $CO_2$ and $C_{5+}$.

The concentrated slurry stream 140 may be further processed if desired; typically, it is a $CO_2$-rich stream. Preferably, the concentrated slurry stream 140 is heated in slurry heater 12 and separated into a liquid phase 160 and a gaseous phase 160; the gaseous phase 160 may be combined with a fuel gas stream.

As shown in FIG. 1, the slurry stream 120 may be pumped to higher pressure before being separated (as stream 130) in the solid/liquid separator 9.

The gaseous stream 80 is passed through the first heat exchanger 3 thereby obtaining a heated gaseous stream 270; if desired some inerts (such as $N_2$) may be removed from the heated gaseous stream 270 as (minor) stream 280. As stream 80 is used to cool the stream 30, this is an "auto-refrigeration" step.

The heated gaseous stream 270 is compressed in compressor 13 thereby obtaining a compressed gas stream 220. Part 230 of the compressed gas stream 220 is combined with the contaminated hydrocarbon-containing gas stream 20.

As can be seen in the embodiment of FIG. 1, a part 240 of the compressed gas stream 220 is passed through the second heat exchanger 15 (and cooled therein) thereby obtaining a cooled compressed gas stream 250. The cooled compressed gas stream 250 is expanded in expander 16 thereby obtaining an expanded gas stream 260. Subsequently, the expanded gas stream 260 is combined with the gaseous stream 80 to form stream 265.

Furthermore, in the embodiment of FIG. 1, the gaseous stream 110 is passed as stream 190 through the second heat exchanger 15 thereby obtaining a second heated gaseous stream 200. The second heated gaseous stream 200 is compressed in compressor 14 thereby obtaining a second compressed gas stream 210; this second compressed gas stream 210 is combined with the heated gaseous stream 270 (to form stream 215).

Also, it is preferred that the liquid hydrocarbon stream 170 is stored in storage tank 11, and that a boil-off gas stream 180 from said storage tank 11 is combined with the gaseous stream 110 to form stream 190.

Table 1 below shows an actual non-limiting example, providing information on conditions and composition of the various streams, whilst using the scheme of FIG. 1 for processing a natural gas stream contaminated with $CO_2$. The composition of LNG stream 90 is given in Table 2. Stream 120 comprised 84% of stream 110 (and stream 100 16%).

TABLE 1

Composition and properties of various streams

| Stream | Pressure [bara] | Temp. [° C.] | State | Amount of $CH_4$ [mol %] | Amount of $CO_2$ [mol %] | Amount of $C_{2+}$ [mol %] | Amount of $N_2$ [mol %] |
|---|---|---|---|---|---|---|---|
| 10 | 45 | 30 | Gas | 82 | 2 | 14 | 2 |
| 20 | 95 | 30 | Gas | 82 | 2 | 14 | 2 |
| 30 | 95 | 30 | Gas | 80 | 1 | 5 | 14 |
| 40 | 95 | −74 | Gas/liquid | 80 | 1 | 5 | 14 |
| 50 | 95 | −74 | Liquid | n.d. | n.d. | n.d. | n.d. |
| 60 | 95 | −74 | Gas | 80 | 1 | 5 | 14 |

TABLE 1-continued

Composition and properties of various streams

| Stream | Pressure [bara] | Temp. [° C.] | State | Amount of $CH_4$ [mol %] | Amount of $CO_2$ [mol %] | Amount of $C_{2+}$ [mol %] | Amount of $N_2$ [mol %] |
|---|---|---|---|---|---|---|---|
| 70 | 20 | −111 | Gas/liquid | 80 | 1 | 5 | 14 |
| 80 | 20 | −111 | Gas | 74 | 0.2 | 0.8 | 25 |
| 90 | 20 | −111 | Liquid | 84 | 1.4 | 9.6 | 5 |
| 100 | 2 | −152 | Liquid/solid/gas | 84 | 1.4 | 9.6 | 5 |
| 110 | 2 | −152 | Gas | 87 | — | — | 13 |
| 120 | 2 | −152 | Liquid/solid | 47 | 42 | 0.7 | 0.3 |
| 130 | 6 | −152 | Liquid/solid | 47 | 42 | 0.7 | 0.3 |
| 140 | 5 | −152 | Liquid/solid | 47 | 42 | 0.7 | 0.3 |
| 150 | 5 | 10 | Gas | 47 | 42 | 0.7 | 0.3 |
| 160 | 5 | 10 | Liquid | 1 | 3.5 | 95.5 | — |
| 170 | 2.5 | −148 | Liquid | 84 | 0.1 | 15.3 | 0.6 |
| 180 | 2.5 | −148 | Gas | 88 | — | — | 12 |
| 190 | 2 | −148 | Gas | 87 | 1 | 1 | 13 |
| 200 | 2 | 26 | Gas | 87 | 1 | 1 | 13 |
| 210 | 20 | 30 | Gas | 87 | 1 | 1 | 13 |
| 215 | 20 | 30 | Gas | 78 | 0.2 | 0.8 | 21 |
| 220 | 95 | 30 | Gas | 78 | 0.2 | 0.8 | 21 |
| 230 | 95 | 30 | Gas | 78 | 0.2 | 0.8 | 21 |
| 240 | 95 | 30 | Gas | 78 | 0.2 | 0.8 | 21 |
| 250 | 95 | 9 | Gas | 78 | 0.2 | 0.8 | 21 |
| 260 | 20 | −81 | Gas | 78 | 0.2 | 0.8 | 21 |
| 265 | 20 | −92 | Gas | 77 | 0.2 | 0.8 | 22 |
| 270 | 20 | 28 | Gas | 77 | 0.2 | 0.8 | 22 |
| 280 | 20 | 28 | Gas | 77 | 0.2 | 0.8 | 22 |

TABLE 2

Composition of stream 170

| Component | [mol %] |
|---|---|
| Nitrogen | 0.56 |
| $CO_2$ | 0.08 |
| Methane | 83.85 |
| Ethane | 7.77 |
| Propane | 4.43 |
| i-Butane | 1.11 |
| n-Butane | 1.11 |
| $C_{5+}$ (sum of the below 4) | 1.09 |
| i-Pentane | 0.43 |
| n-Pentane | 0.43 |
| n-Hexane | 0.22 |
| Benzene | 0.01 |

As can be seen from Table 2, the composition of LNG stream 170 differs from a common LNG product (see e.g. "Small-scale LNG facility development", B.C. Price, Hydrocarbon Processing, January 2003) in that it contains more $CO_2$ (0.08 mol % vs. 0.0125 mol % in the above reference), and more benzene (0.01 mol % vs. 0.001 mol % in the above reference). Also, the composition of LNG stream 170 has an uncommonly high $C_{5+}$ content (1.09 mol %, whilst it is typically lower).

The person skilled in the art will readily understand that many modifications may be made without departing from the scope of the invention.

The invention claimed is:

1. A method of liquefying a contaminated hydrocarbon-containing gas stream, the method comprising at least the steps of:
   (a) providing a contaminated hydrocarbon-containing gas stream;
   (b) cooling the contaminated hydrocarbon-containing gas stream in a first heat exchanger thereby obtaining a cooled contaminated hydrocarbon-containing stream;
   (c) cooling the cooled contaminated hydrocarbon-containing stream in an expander thereby obtaining a partially liquefied stream;
   (d) separating the partially liquefied stream in a first separator thereby obtaining a first gaseous stream and a liquid stream;
   (e) expanding the liquid steam obtained in step (d) thereby obtaining a multiphase stream, the multiphase stream containing a vapour phase, a liquid phase and a solid phase;
   (f) separating the multiphase stream in a second separator thereby obtaining a second gaseous stream and a slurry stream;
   (g) separating the slurry stream in a solid/liquid separator thereby obtaining a liquid hydrocarbon stream and a concentrated slurry stream;
   (h) passing the first gaseous stream obtained in step (d) through the first heat exchanger thereby obtaining a heated gaseous stream; and
   (i) compressing the heated gaseous stream thereby obtaining a compressed gas stream; and
   (j) combining a first portion of the compressed gas stream obtained in step (i) with the contaminated hydrocarbon-containing gas stream provided in step (a);
   (k) cooling a second part of the compressed gas stream obtained in step (i) through a second heat exchanger thereby obtaining a cooled compressed gas stream;
   (l) expanding the cooled compressed gas stream thereby obtaining an expanded gas stream; and
   (m) combining the expanded gas stream with the first gaseous stream obtained in step (d).

2. The method according to claim 1, wherein the contaminated hydrocarbon-containing gas stream comprises at least 50 vol. % methane.

3. The method according to claim 1, wherein the cooled contaminated hydrocarbon-containing stream obtained in step (b) has a temperature of at most −40° C.

4. The method according to claim 1, wherein the multi-phase stream obtained in step (e) has a temperature of at most −100° C.

5. The method according to claim 1, further comprising: passing the second gaseous stream obtained in step (f) through the second heat exchanger thereby obtaining a second heated gaseous stream; compressing the second heated gaseous stream thereby obtaining a second compressed gas stream; and combining the second compressed gas stream with the heated gaseous stream obtained in step (h).

6. The method according to claim 1, wherein the liquid hydrocarbon stream obtained in step (g) is stored in a storage tank, and wherein a boil-off gas stream from said storage tank is combined with the second gaseous stream obtained in step (f).

7. The method according to claim 5, wherein the liquid hydrocarbon stream obtained in step (g) is stored in a storage tank, and wherein a boil-off gas stream from said storage tank is combined with the second gaseous stream obtained in step (f).

\* \* \* \* \*